United States Patent
Park et al.

(10) Patent No.: US 8,014,840 B2
(45) Date of Patent: *Sep. 6, 2011

(54) SLIDING MODULE AND PORTABLE TERMINAL THEREWITH

(75) Inventors: Myoung-Hoon Park, Seoul (KR); Soo-Ik Jung, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1349 days.

This patent is subject to a terminal disclaimer.

(21) Appl. No.: 11/540,584

(22) Filed: Oct. 2, 2006

(65) Prior Publication Data

US 2007/0107922 A1    May 17, 2007

(30) Foreign Application Priority Data

Nov. 11, 2005   (KR) .................. 10-2005-0108254

(51) Int. Cl.
    *H04M 1/00*    (2006.01)
(52) U.S. Cl. ............... 455/575.4; 455/575.1; 455/575.3; 379/433.11; 379/433.12
(58) Field of Classification Search ......... 455/575.1, 455/575.3, 575.4; 379/433.01, 433.11, 433.12, 379/440
    See application file for complete search history.

(56) References Cited

U.S. PATENT DOCUMENTS

| | | | |
|---|---|---|---|
| 6,326,948 B1 * | 12/2001 | Kobachi et al. | 345/157 |
| 7,671,836 B2 * | 3/2010 | Lehtonen | 345/156 |
| 2004/0198246 A1 | 10/2004 | Tsai | |
| 2005/0090298 A1 | 4/2005 | Park et al. | |
| 2005/0091431 A1 * | 4/2005 | Olodort et al. | 710/72 |
| 2005/0104856 A1 | 5/2005 | Jacobs | |

FOREIGN PATENT DOCUMENTS

| | | |
|---|---|---|
| CN | 200510092932 | 3/2006 |
| EP | 1592209 | 11/2005 |
| WO | 2005071928 | 8/2005 |
| WO | WO 2005/099232 | 10/2005 |

OTHER PUBLICATIONS

European Search Report for Application No. EP06023557; May 19, 2011.

* cited by examiner

*Primary Examiner* — Tuan H Nguyen
(74) *Attorney, Agent, or Firm* — Roylance, Abrams, Berdo & Goodman, L.L.P

(57) ABSTRACT

A portable terminal, including first and second housings, and a sliding module interposed therebetween to connect them. The second housing is slidable with respect to the first housing to upper and lower sides of the first housing along a first axis and to left and right sides of the first housing along a second axis. The sliding module includes a guide member disposed on a surface of the first housing, a first sliding member slidably engaged with the guide member, and a second sliding member on the second housing. The second sliding member slidably engages the first sliding member. The first sliding member moves the second housing to the upper side and the lower side of the first housing along the first axis and the second sliding member moves the second housing to the left and right sides of the first housing along the second axis.

25 Claims, 7 Drawing Sheets

SLIDING MODULE AND PORTABLE TERMINAL THEREWITH

CROSS-REFERENCE TO RELATED APPLICATION

This application claims the benefit under 35 U.S.C. §119 (a) of an application entitled "Sliding Module For Portable Terminal" filed with the Korean Intellectual Property Office on Nov. 11, 2005 and assigned Serial No. 2005-108254, the entire contents of which are hereby incorporated by reference.

BACKGROUND OF THE INVENTION

1. Field of the Invention

The present invention relates to a portable terminal. More particularly, the present invention relates to a sliding module for a sliding type portable terminal that allows one housing to slide on the other housing in four directions, that is, upward, downward, right, and left.

2. Description of the Related Art

In general, portable terminals may be classified into various types according to their appearance, such as a bar type portable terminal, a flip type portable terminal, or a folder type portable terminal.

A bar type portable terminal has a single body housing on which a data input/output unit, a transmitter, and a receiver are mounted. A keypad used as the data input/output unit always is exposed to the outside, which may result in malfunctions. Further, there is a limit to the miniaturization of the portable terminal because it is difficult to secure an appropriate distance between the transmitter and receiver.

A flip type portable terminal has a body, a flip, and a hinge module for connecting the flip to the body. The body includes a data input/output unit, a transmitter, and a receiver mounted on the body. The flip covers the keypad used as the data input unit to prevent malfunctions of the keypad. However, like the bar type portable, there is a limit to the miniaturization of the flip type portable terminal because it is difficult to secure an appropriate distance between the transmitter and the receiver.

A folder type portable terminal includes a body, a folder, and a hinge module for rotatably connecting the folder to the body. The folder rotates to open and close the body. In a communication-standby mode in which the folder is closed over the body, it is possible to prevent malfunctions of the keypad. In a communication mode, as the folder is unfolded, it is possible to secure an appropriate distance between the transmitter and the receiver. Thus, it is useful for the miniaturization of the portable terminal. Accordingly, the folder type portable terminals have become increasingly popular because of current market trends favoring smaller portable terminals.

In the flip type portable terminal or the folder type portable terminal, when the flip or the folder is rotated over a predetermined angle with respect to the body by the hinge module that rotatably connects the flip or the folder to the body, the flip or the folder is subjected to force in the opening direction even though external force is no longer applied to the flip or the folder. On the other hand, when the flip or the folder is rotated by an angle smaller than the predetermined angle, the flip or the folder is subjected to force in the direction of closing upon the body.

In the meantime, as portable terminal designs have become more diverse, a sliding type portable terminal has been developed and is commercially available. A sliding type portable terminal includes two housings, one of which slides on the other housing so as to open and close the portable terminal.

U.S. Pat. No. 6,822,871, which issued on Nov. 23, 2004, is assigned to the same assignee as the present invention, and is hereby incorporated by reference in its entirety, discloses a portable terminal having a pair of housings which are slidably assembled with each other, and a sliding module for the portable terminal. In the disclosed portable terminal, one housing movably slides, so as to open and close a part of another housing, particularly a keypad. A spring module and a rail-shaped sliding guide are assembled with the housings of the portable terminal, respectively, so as to slidably connect one housing to another housing of the portable terminal.

The sliding type portable terminals have various sliding modules in which a sliding plate as well as the sliding module having a rail shape are assembled with one housing while the sliding guide is integrated with another housing.

In addition to the further diversification of mobile communication services, portable terminals have become multifunctional. However, portable terminals have not yet diverged from the basic types such as a folder type, a sliding type, and the like. Further, as the use of the portable terminal has become universal, users' tastes also have varied. Nevertheless, the current types of portable terminals do not satisfy users' various tastes.

Accordingly, there is a need for more diverse portable terminals.

SUMMARY OF THE INVENTION

An aspect of the present invention is to address at least the above problems and/or disadvantages and to provide at least the advantages described below. Accordingly, an aspect of the present invention is to provide a sliding module for a portable terminal, which the portable terminal to be used in various manners.

It is another object of the present invention to provide a sliding module for a portable terminal which satisfies users' various tastes.

In order to accomplish these objects of the present invention, a sliding module for a portable terminal is provided. The sliding module is interposed between first and second housings so as to connect the second housing to the first housing so that the second housing is slidable with respect to the first housing. The sliding module includes a first sliding member, a second sliding member, first stopper means, and second stopper means. The first sliding member is assembled with the first housing for slidably moving the second housing to an upper side or a lower side of the first housing in a first direction. The second sliding member is fixed to the second housing and assembled with the first sliding member for slidably moving the second housing to a left or right side of the first housing in a second direction. The first stopper means is disposed between the first and second housings for restricting a sliding movement of the second housing in the second direction when the second housing moves to the upper or lower side of the first housing. The second stopper means is disposed between the first and second housing for restricting a sliding movement of the second housing in the first direction when the second housing moves to the left or right side of the first housing.

In order to accomplish these objects of the present invention, a sliding module for a portable terminal is provided. The sliding module is interposed between first and second housings so as to connect the second housing to the first housing so that the second housing is slidable with respect to the first housing. The sliding module includes a guide member fixed to a surface of the first housing, a first sliding member assembled with the guide member so as to slide on the guide member, for slidably moving the second housing to an upper side or a lower side of the first housing in a first direction, and a second sliding member fixed to the second housing and assembled with the first sliding member so as to slide on the first housing, for slidably moving the second housing to a left or right side of the first housing in a second direction.

BRIEF DESCRIPTION OF THE DRAWINGS

The above and other objects, features, and advantages of the present invention will be more apparent from the following detailed description taken in conjunction with the accompanying drawings, in which.

Throughout the drawings, the same reference numerals will be understood to refer to the same elements, features, and structures.

DETAILED DESCRIPTION OF THE EXEMPLARY EMBODIMENT

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
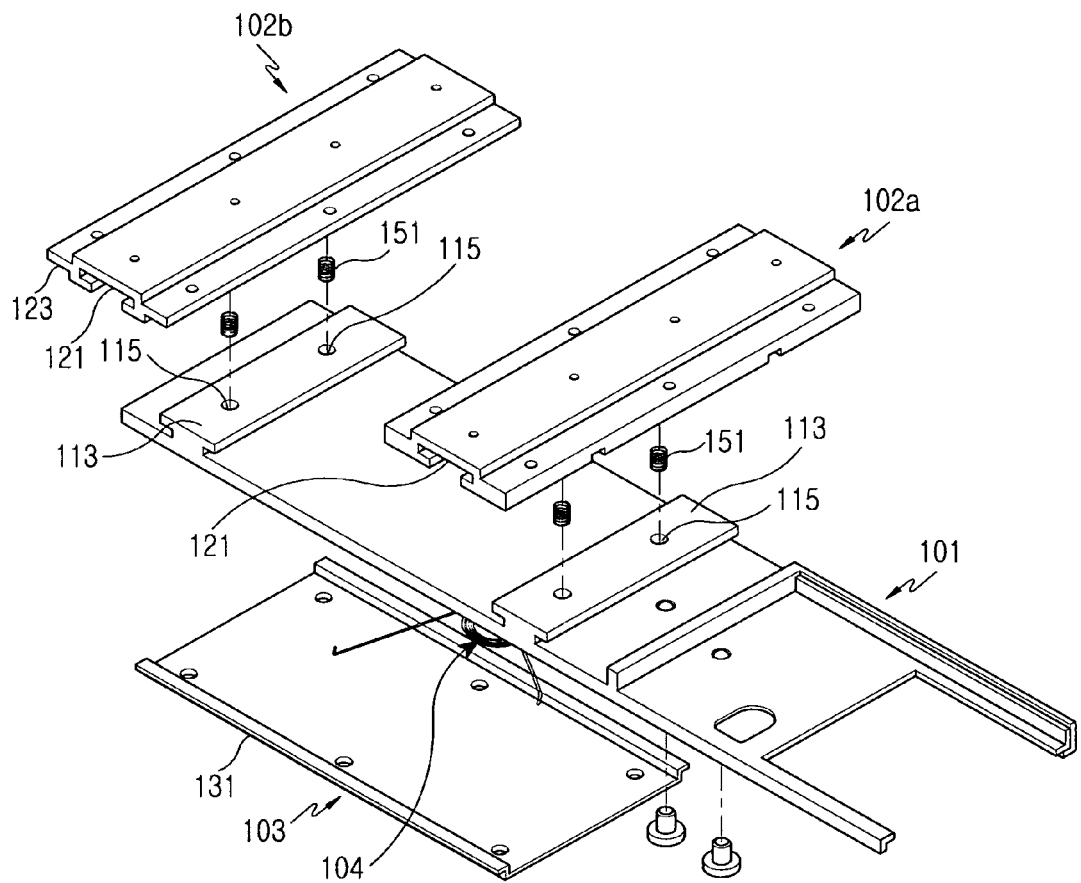
FIG. 1 is an exploded perspective view of a sliding module for a portable terminal according to an exemplary embodiment of the present invention.
Figure 2:
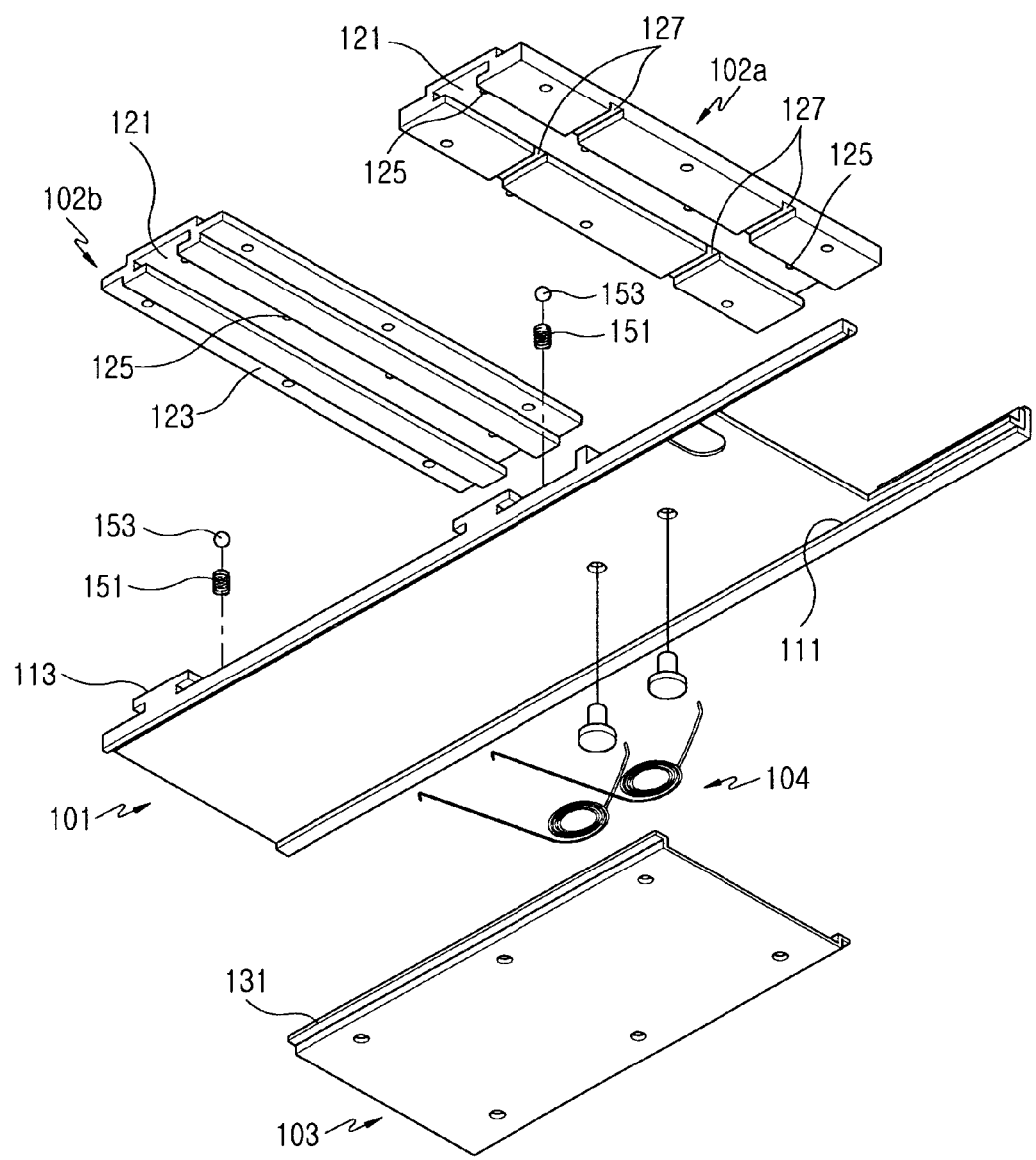
FIG. 2 is a perspective view of the sliding module shown in FIG. 1, which is viewed from the bottom of the sliding module.
Figure 3:
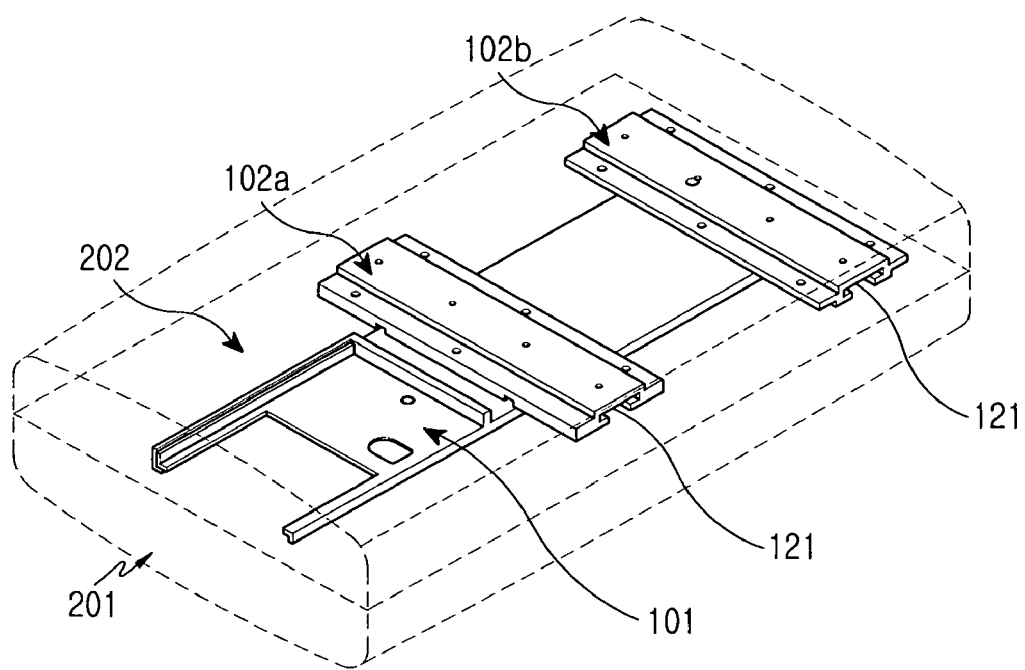
FIG. 3 is a perspective view of the sliding module shown in FIG. 1, in which the sliding module is assembled with the portable terminal.

As shown in FIGS. 1 to 3, a sliding module 100 of a portable terminal 200 according to an exemplary embodiment of the present invention includes first and second sliding members 101, 102a, and 102b which slide on the first housing 201 of the portable terminal 200. Further, the sliding module 100 may separately include a guide member 103 for assembling the first sliding member 101 with the first housing 201 so that the first sliding member 101 movably slides on the first housing 201.

Referring to FIGS. 6 to 9, the portable terminal 200 includes a first housing 201, and a second housing 202 slidably assembled with the first housing 201. The second housing 202 is assembled with the first housing 201 by means of the sliding module 100. A transmitter, an input unit (not shown) such as a keypad, a receiver, and an output unit (not shown) such as a display unit of the portable terminal 200 are appropriately arranged on the first and second housing 201 and 202.

The second housing 202 may movably slide on the first housing 201 in a first direction (X, see FIG. 6) and be located at an upper side or a lower side of the first housing 201. Alternatively, the second housing 202 may slide on the first housing 201 in a second direction (Y, see FIG. 8) and be positioned at a right side or a left side.

Referring to FIGS. 1 to 3, the first sliding member 101 has sliding grooves 111 formed along a lengthwise direction on a lower surface thereof, and a guide rail 113 formed on an upper surface thereof. The first sliding member 101 is mounted on the first housing 201 and movably slides in a first direction X. At this time, the sliding grooves 111 extend along the first direction X so as to guide the sliding movement of the first sliding member 101.

The first sliding member 101 is assembled with the first housing 201 of the portable terminal 200 by the guide member 103. The guide member 103 is fixed to the first housing 201, and has sliding ribs 131 formed at both edges that extend in the first direction X. The sliding ribs 131 are engaged with the sliding grooves 111 of the first sliding member 101. Thus, the first sliding member 101 can be assembled with the guide member 103 to movably slide along the guide member 103.

To simplify the sliding module 100, the guide member 103 may be integrally formed on the first housing 201. If the guide member 103 is integrally formed with the first housing, the number of parts can be reduced. Therefore, it is possible to simplify the assembly of the sliding module 100.

Since the guide member 103 is assembled with the first sliding member 101 so that the first sliding member 101 movably slides along the guide member 103, while maintaining the combination of the first housing 201 and the first sliding member 101, the guide member 103 may be designed to have greater mechanical strength and durability.

On the other hand, an elastic member can be interposed between the guide member 103 and the first sliding member 101, so as to provide elasticity for slidably moving the first sliding member 101. The elastic member 104 has a first end supported by the guide member 103 and a second end supported by the first sliding member 101, and provides elasticity so that the both ends of the elastic member 104 are spaced away from each other. The area where both ends of the elastic member 104 approach each other is located out of the range in which the first sliding member 101 slides. Therefore, the elastic member 104 biases the first sliding member 101 towards an upper side or a lower side of the guide member 103.

The second sliding members 102a and 102b are fixed to the second housing 202 and are also assembled with the first sliding member 101, so as to movably slide in the second direction Y. The guide rails 113 of the first sliding member 101 are assembled with the second sliding members 102a and 102b, and extend in the second direction Y. The second sliding member 102 has a guide groove 121 formed on a surface thereof, and is engaged with the guide rail 113 so as to slidably contact the guide rail. Specifically, the second sliding members 102a and 102b are assembled with the first sliding member 101 by means of the guide rail 113 and the guide groove 121, so as to movably slide in the second direction Y.

Pairs of recesses 125 are formed in the guide groove 121 in the second direction Y. At least one ball 153 (which may be formed of metal) is installed in the first sliding member 101, particularly guide rail 113, so as to move in and out the first sliding member 101. The guide rail 113 has receiving grooves 115 which receive the balls 153. In addition, coil springs 151 are received in the receiving grooves 115 respectively, so as to bias the balls 153 in a direction that the balls 153 protrude on the guide rail 113.

According to the exemplary embodiment of the present invention, two pairs of grooves 125 are provided. The pairs of balls 153 are mounted on the guide rails 113, respectively. As the second sliding members 102a and 102b move in the second direction Y, one pair of grooves 125 among the pairs of grooves 125 are engaged with the balls 153 while facing the balls 153.

In the present exemplary embodiment, the two sliding members 102a and 102b are assembled with the first sliding member 101, one of which is located at an upper side, and the other of which is located at a lower side of the first sliding member 101. However, to assemble the second housing 202 with the first sliding member 101 so that the second housing 202 movably slides on the sliding member 101 in the second direction Y, the second sliding members 102a and 102b need not be configured as a pair. Specifically, although any one of the sliding members 102a and 102b is mounted on the first sliding member 101, it is possible to realize the sliding movement of the second housing 202 in the second direction Y. Further, it will be understood by persons skilled in the art that plural pairs of second sliding members 102a and 102b may be used.

Figure 4:
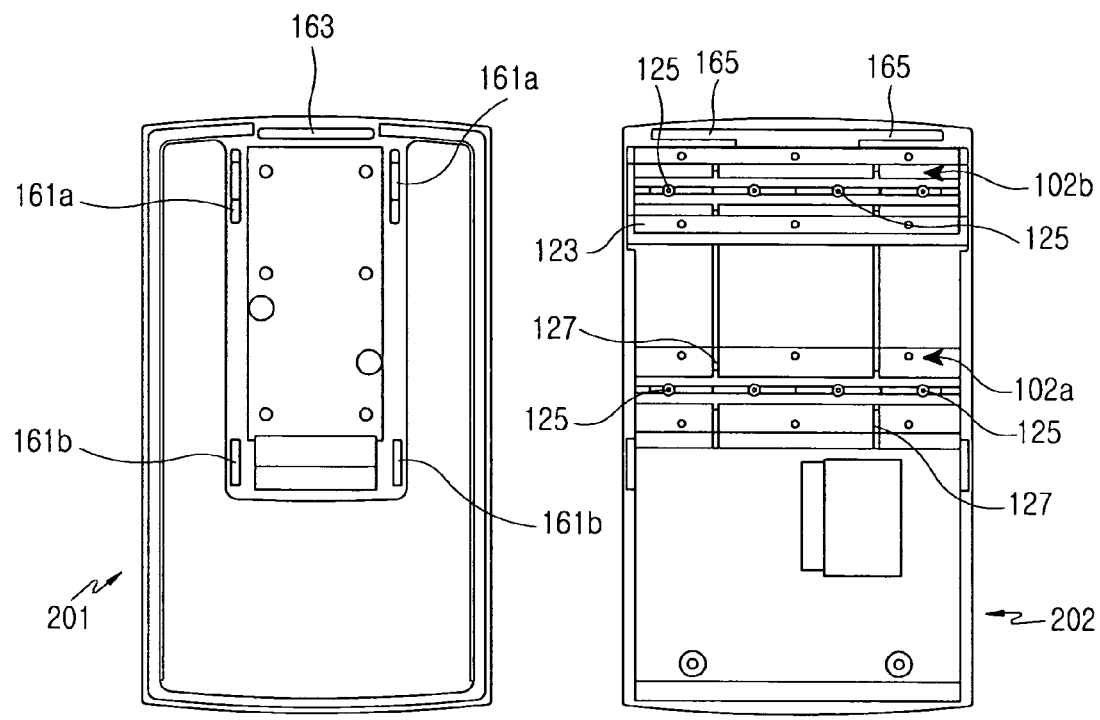
FIG. 4 is a plan view of the housings of the portable terminal shown in FIG. 3.
Figure 5:
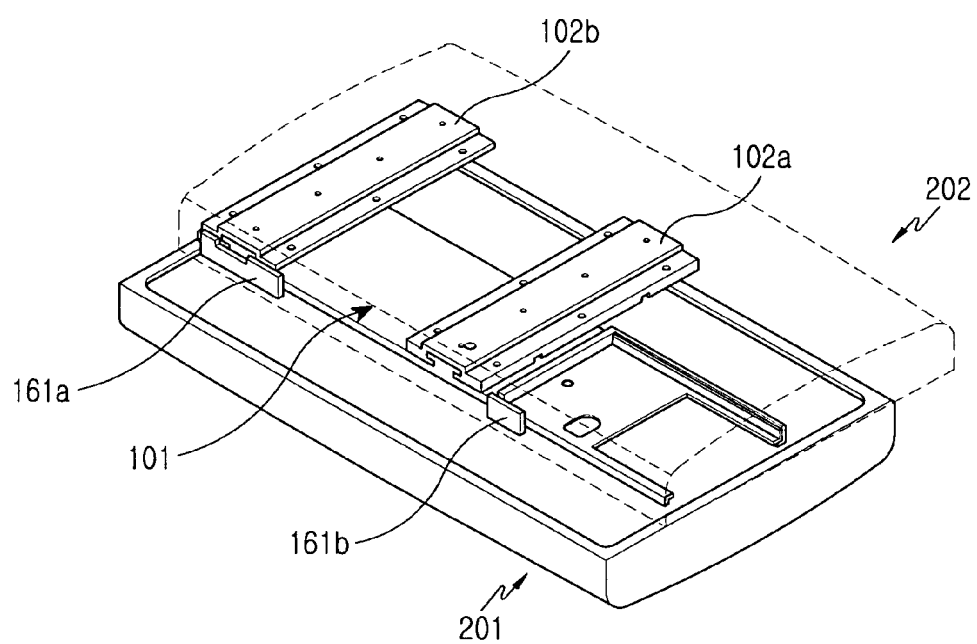
FIG. 5 is a perspective view of the portable terminal shown in FIG. 3, sliding in a second direction.

Referring to FIGS. 4 and 5, the sliding module 100 is provided with stopper members to restrict the sliding movement of the second housing 202 in a direction from one position to another position, based on a position to which the second housing 202 moves. The stopper members include a first stopper member and a second stopper member. The first stopper member restricts the sliding movement of the second housing 202 in the second direction Y when the second housing 202 moves in the first direction X so as to reach the upper side or lower side of the first housing 201, while the second stopper member restricts the sliding movement of the second housing 202 in the first direction X when the second housing moves in the second direction Y so as to reach the left side or the right side of the first housing 201.

The first stopper member includes at least one pair of first stopper ribs 161a and 161b formed on the first housing 201, and first stopper grooves 127 formed in the lower member 102a of the second sliding members 102a and 102b. However, only the first stopper grooves 127 formed in the lower member 102a of the second sliding members 102a and 102b are used to realize the function of the first stopper member. This is because the upper member 102b of the second sliding members 102a and 102b cannot carry out the function of the stopper when the second housing 202 moves toward the upper side of the first housing 201 so that the upper member 102b of the second sliding members 102a and 102b does not face the first housing 201.

The first stopper ribs 161a and 161b, and the first stopper grooves 127 respectively extend in the first direction X. Therefore, when the first stopper ribs 161a and 161b are engaged with the first stopper grooves 127, the movement of the second housing 202 in the second direction Y is restricted, but the second housing 202 may move in the first direction X.

The first stopper ribs 161a and 161b are formed at an upper portion and an intermediate portion of the first housing 201. When the second housing 202 moves toward the upper side of the first housing 201, the second sliding member 102a located at a lower side of the second housing 202 faces the first stopper rib 161a located at an upper side of the first housing 201. In contrast, when the second housing 202 moves toward the lower side of the first housing 201, the second sliding member faces the first stopper rib 161b located at a lower side of the first sliding member 201. One of the first stopper ribs 161a and 161b faces the second sliding member 102a located at a lower side of the second housing 201 so as to be engaged with the first stopper groove 127. Thus, after the second housing 202 moves toward the upper or lower side of the first housing 201, the movement of the second housing 202 in the second direction Y is restricted.

Figure 6:
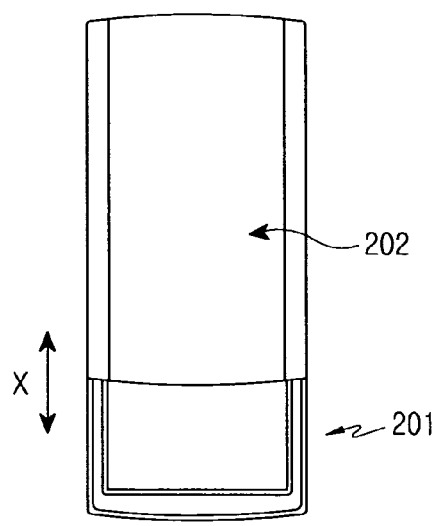
FIGS. 6 to 9 are views showing the portable terminal shown in FIG. 3, sliding in different directions.
Figure 7:
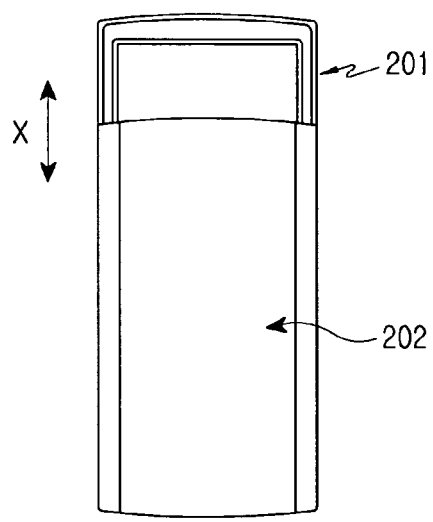

It will be understood by persons skilled in the art that the first stopper ribs 161a and 161b can be formed at appropriate positions in consideration of the function of the first stopper member. FIGS. 6 and 7 show the movement of the second housing 202 toward the upper or lower side of the first housing along the first direction X. As shown in FIGS. 6 and 7, the second housing 202 may have a longer upward movement distance than a downward movement distance. Thus, when the second housing 202 overlaps with the first housing 201, the first stopper rib 161a located at the upper side of the first housing 201 is farther away from the second sliding member 102a located at a lower side of the second housing 202.

In the present exemplary embodiment, on the other hand, when the second housing 202 overlaps with the first housing 201, the second sliding member 102b faces the first stopper rib 161a. Therefore, when the second sliding member 102b and the first stopper rib 161b interfere with each other, the sliding movement of the second housing 202 in the second direction Y is restricted. To prevent the movement of the second housing 202 from being restricted, an avoidance groove 123 is formed in the second sliding member 102b located at the upper side of the second housing 202, while a groove having a desired shape is formed in the first stopper rib 161a.

An upper portion protruding from the first stopper rib 161a is located in the avoidance groove 123, and a portion protruding above the avoidance groove 123 from the second sliding member 102b is located at a portion in which a groove is formed. Therefore, it is possible to prevent interference between the second sliding member 102b and the first stopper rib 161a when the second housing 202 overlaps with the first housing 201.

In the meantime, when the second housing 202 moves toward the upper side of the first housing 201, the second sliding member 102a is restricted by an upper portion protruding from the first stopper rib 161a and cannot movably slide in the second direction. Specifically, when the second housing 202 moves toward the upper side of the first housing 201, the upper portion protruding from the first stopper rib 161a is engaged with the first stopper groove 127 of the second sliding member 102a.

The second stopper member includes a second stopper groove 165 (see FIG. 4) formed in one of the first and second housings 201 and 202, and a second stopper rib 163 (see FIG. 4) formed in the other housing. In the present exemplary embodiment, the second stopper groove 165 is formed in the second housing 202, and the second stopper rib 163 is formed in the first housing 201.

The second stopper rib 163 is formed at an upper center of the first housing 201, and the second stopper groove 165 is formed at an upper end of the second housing 202 so as to extend in the second direction Y. The second stopper groove 165 is partially opened at the center portion thereof in the first direction X, so as not to interfere with the second stopper rib 163 when the second housing 202 overlaps with the first housing 201 while moving upward or downward.

Figure 8:
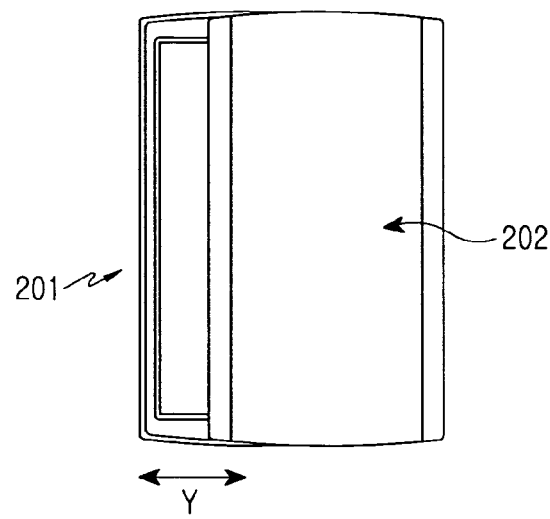
Figure 9:
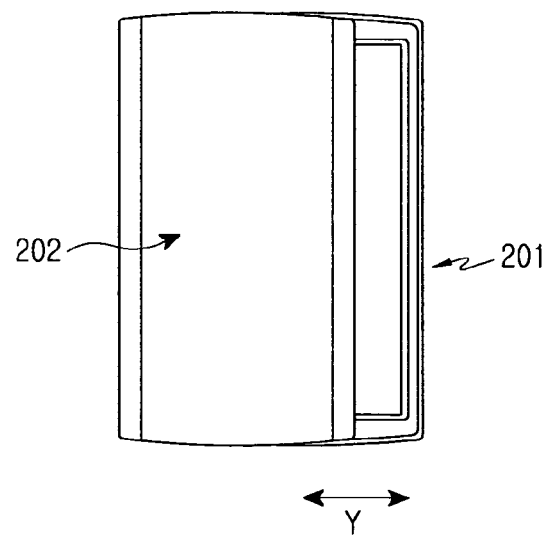

As shown in FIGS. 8 and 9, when the second housing 202 moves to the left or right side of the first housing, the second stopper rib 163 is restricted by the second stopper groove 165 so that the second housing 202 cannot move in the first direction X.

The portable terminal 200 having the sliding module 100 configured as described above may operate in different modes depending on the position of the second housing 202. Specifically, if the second housing 202 moves to the upper side of the first housing 201, the portable terminal operates in the communication mode. On the other hand, if the second housing 202 moves to the lower side of the first housing 201, the portable terminal operates in a photographing mode. In addition, if the second housing 202 moves to the left or right side of the first housing 201, the portable terminal operates in a broadcast reception mode or sound reproduction mode.

As described above, the sliding module for the portable terminal according to the present invention allows one of housings to move on the other housing in four-ways, that is, in upward, downward, left, and right directions, thereby diversifying the types of the portable terminals. Thus, it is possible to provide a portable terminal capable of satisfying users' various tastes. In addition, the portable terminal may operate in different modes depending on the movement direction of the housing thereof, so that a user can conveniently operate the portable terminal.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A sliding module for a portable terminal having a first housing and a second housing, the sliding module being interposed between the first and second housings so as to connect the second housing to the first housing so that the second housing is slidable with respect to the first housing, the sliding module comprising:
    a first sliding member mounted on the first housing to slidably move along a first axis for slidably moving the second housing to upper and lower sides of the first housing along the first axis;
    a second sliding member fixed to the second housing and assembled with the first sliding member to slidably move along a second axis for slidably moving the second housing to left and right sides of the first housing along the second axis;
    first stopper means disposed between the first and second housings for restricting movement of the second housing along the second axis when the second housing is moved to the upper or lower side of the first housing; and
    second stopper means disposed between the first and second housing for restricting movement of the second housing along the first axis when the second housing is moved to the left or right side of the first housing.

2. The sliding module for a portable terminal as claimed in claim 1, further comprising a guide member fixed to a surface of the first housing, wherein the first sliding member is assembled with the first housing so as to cover both ends of the guide member and moves along the first axis.

3. The sliding module for a portable terminal as claimed in claim 2, further comprising an elastic member having a first end supported by the guide member and a second end supported by the first sliding member, the elastic member biasing the first sliding member towards an upper side or a lower side of the guide member.

4. The sliding module for a portable terminal as claimed in claim 1, further comprising:
    a guide rail on the first sliding member; and
    a guide groove on the second sliding member, the guide groove engaging the guide rail so as to slide along the guide rail,
    wherein the second sliding member is integrated with the first sliding member so as to slide along the second axis when the guide groove is engaged with the guide rail.

5. The sliding module for a portable terminal as claimed in claim 1, wherein the first stopper means includes
    at least one pair of first stopper ribs extending along the first axis on the first housing; and
    a first stopper groove extending along the first axis on the second sliding member, the first stopper groove engaging one of the first stopper ribs when the second housing moves to the upper or lower side of the first housing.

6. The sliding module for a portable terminal as claimed in claim 1, wherein the second stopper means includes
    a second stopper groove extending along the second axis on one of the first and second housings; and
    a second stopper rib on the other housing of the first and second housings and sliding in the second stopper groove when the second housing moves along the second axis, wherein the second stopper rib is restricted in the second stopper groove so as not to move along the first axis when the second housing moves to the left or right side of the first housing.

7. The sliding module for a portable terminal as claimed in claim 1, further comprising:
    at least one pair of recesses formed on a surface of the second sliding member and arranged along the second axis;
    at least one ball located in the first sliding member so as to move in and out of the first sliding member; and
    an elastic member for biasing the at least one ball so that it protrudes from the first sliding member, wherein the ball is engaged with one of the grooves when the second housing slides along the second axis.

8. The sliding module for a portable terminal as claimed in claim 7, wherein the elastic member comprises a coil spring.

9. The sliding module for a portable terminal as claimed in claim 7, wherein the at least one ball is formed of metal.

10. A portable terminal comprising:
    a first housing;
    a second housing; and
    a sliding module interposed between the first and second housings to connect the second housing to the first housing,
    wherein the second housing is slidable with respect to the first housing to an upper side and a lower side of the first housing along a first axis and to a left and a right side of the first housing along a second axis;
    wherein the sliding module comprises:
    a guide member disposed on a surface of the first housing;
    a first sliding member slidably engaged with the guide member; and
    a second sliding member on the second housing, the second sliding member being slidably engaged with the first sliding member,
    wherein the first sliding member moves the second housing to the upper side and the lower side of the first housing along the first axis and the second sliding member moves the second housing to the left and right sides of the first housing along the second axis.

11. The portable terminal as claimed in claim 10, wherein the guide member is integrally formed on the first housing.

12. The portable terminal as claimed in claim 10, the sliding module further comprising:
    a guide rail formed on the first sliding member; and
    a guide groove formed in the second sliding member and engaged with the guide rail so as to slide along the guide rail.

13. The portable terminal as claimed in claim 12, the sliding module further comprising:

at least one pair of recesses on a surface of the second sliding member and arranged along the second axis;

at least one ball located in the first sliding member so as to move in and out of the first sliding member; and an elastic member for biasing the at least one ball so that it protrudes from the first sliding member, wherein the ball is engaged with one of the grooves when the second housing slides along the second axis.

14. The portable terminal as claimed in claim 13, wherein the elastic member comprises a coil spring.

15. The portable terminal as claimed in claim 13, wherein the at least one ball is formed of metal.

16. The portable terminal as claimed in claim 10, wherein the second sliding member comprises an upper second sliding member and a lower second sliding member that engage the first sliding member so as to slide on the first sliding member.

17. The portable terminal as claimed in claim 16, the sliding module further comprising:
at least one pair of first stopper ribs extending along the first axis on the first housing; and
a first stopper groove formed in one of the second sliding members, the first stopper groove engaging one of the first stopper ribs when the second housing moves to the upper or lower side of the first housing.

18. The portable terminal as claimed in claim 17, wherein the first stopper groove is disposed on the lower second sliding member and engages one of the first stopper ribs, so as to restrict the movement of the second housing along the second axis, when the second housing moves to the upper or lower side of the first housing.

19. The portable terminal as claimed in claim 17, the sliding module further comprising an avoidance groove formed in the upper second sliding member, an upper one of the pair of first stopper ribs being located in the avoidance groove while facing the upper one of the second sliding members, when the second housing overlaps with the first housing.

20. The portable terminal as claimed in claim 10, the sliding module further comprising:
a second stopper groove extending along the second axis on one of the first and second housings; and
a second stopper rib on the other of first and second housings, the second stopper rib sliding in the second stopper groove when the second housing slides along the second axis, wherein the second stopper rib is restricted in the second stopper groove so as not to move along the first axis when the second housing moves to the left or right side of the first housing.

21. A portable terminal comprising:
a first housing;
a second housing coupled to slidably move on the first housing while facing the first housing; and
a sliding module for coupling the second housing to the first housing,
wherein the second housing slides on the first housing while facing the first housing under the guide of the sliding module, to move in upward, downward, leftward, and rightward directions on the first housing;
wherein the sliding module comprises:
a first sliding member slidably coupled to the first housing for allowing the second housing to slide in upward and downward directions on the first housing along a first axis; and
a second sliding member fixed to the second housing and slidably coupled to the first sliding member for allowing the second housing to slide in leftward and rightward directions on the first housing along a second axis.

22. The portable terminal as claimed in claim 21, wherein the sliding module further comprises:
first stopper means disposed between the first and second housings for restricting movement of the second housing along the second axis when the second housing moves upward or downward on the first housing; and
second stopper means disposed between the first and second housing for restricting movement of the second housing along the first axis when the second housing moves leftward or rightward on the first housing.

23. The portable terminal as claimed in claim 22, wherein the first stopper means comprises:
at least one pair of first stopper ribs on the first housing and extending along the first axis; and
a first stopper groove in the second sliding member and extending along the first axis,
wherein the stopper groove is engaged with one of the first stopper ribs when the second housing moves upward or downward on the first housing.

24. The portable terminal as claimed in claim 22, wherein the second stopper means comprises:
a second stopper groove in one of the first and second housings and extending along the second axis; and
a second stopper rib on the other of the first and second housings and sliding in the second stopper groove when the second housing moves along the second axis,
wherein the second stopper rib is restricted in the second stopper groove so as not to move along the first axis when the second housing moves leftward or rightward on the first housing.

25. The portable terminal as claimed in claim 21, wherein the sliding module further comprises a guide member fixed to a surface of the first housing, and wherein the first sliding member is engaged with the guide member to surround both sides of the guide member and slides along the first axis.

* * * * *